April 2, 1968  R. W. POSTMA  3,375,712
THRUST MEASUREMENT
Filed March 19, 1965

INVENTOR
Robert W. Postma
By
Donald W. Graves
ATTORNEY

2

United States Patent Office 3,375,712
Patented Apr. 2, 1968

3,375,712
THRUST MEASUREMENT
Robert W. Postma, Reseda, Calif., assignor to North American Rockwell Corporation, a corporation of Delaware
Filed Mar. 19, 1965, Ser. No. 441,279
7 Claims. (Cl. 73—117.4)

ABSTRACT OF THE DISCLOSURE

A rocket engine thrust measuring transducer having an accelerometer coupled to a steady state load sensor. The signals from the accelerometer that primarily measure the start and stop load transients and the signals from the load sensor that primarily measure the steady state load transients are summed to constitute a signal that is indicative of thrust measurement.

---

The invention described herein was made in the performance of work under a NASA contract and is subject to the provisions of the National Aeronautics and Space Act of 1958, Public Law 85–568 (72 Stat. 426; 42 USC 2451), as amended.

This invention relates to a method and device for measuring thrust.

More particularly, this invention relates to a method and device for measuring thrust of a rocket engine.

In the design, development and testing of rocket engines, jet engines or other force producing devices, there is a need for accurately measuring the thrust produced during testing. Particularly with small rocket engines, in addition to measuring the steady state thrust obtained by the rocket engine, it is also necessary to accurately track the rapid rise and decay of thrust of the engine as it is started and when it is shut down. It is necessary that the thrust transducers be capable of extended frequency response needed for accurate reproduction of thrust-time profiles with such considerable high frequency content as well as the measurement of steady state thrust after the peak level is reached.

One of the approaches in the past which has been made to measure the transient forces caused by acceleration and steady state thrust levels has been the development of very stiff piezo-electric or piezo-resistive type load cells. However, with a stiff load cell a lower output signal for a given load occurs which results in a less than satisfactory signal-to-noise ratio. In addition, there are coupling problems existent with a high stiffness load cell which results in the need for a very stiff, while light, thrust chamber to load cell coupling. In addition, there must be a very heavy lumped mass to act as an abutment to prevent what has been referred to as "acceleration error." Other methods of providing the transient thrust-time profile as well as steady state or static measurement of thrust has been the use of on-line-analog computers, which, in effect, extend the frequency response of moderately stiff transducers of lower natural frequency. Another approach was to use analog or digital computers to reconstruct the thrust-time profile subsequent to the recording of the test data.

The use of conventional load cells designed primarily for static loads which have been used in the past have been satisfactory only if the frequency components were well below the fundamental resonant frequency of the load cell and attached hardware. However, because of the advent of small rocket engines (for example, in the neighborhood of ten pounds thrust) which produces fast start transients (with rise times in the neighborhood of one-half millisecond, 10 percent to 90 percent of full thrust) stringent requirements for high transient fidelity are imposed upon thrust transducers. In addition to this measurement of the fast start and stop transients, a very precise steady state thrust measurement is needed.

It is to solve the deficiencies of the prior art to which this invention is directed.

In its most brief embodiment, the measurement of force or thrust from a rocket engine or the like is accomplished by coupling an accelerometer to a steady state load sensor. The accelerometer primarily measures accurately the stop and start transients while the load cell or load sensor primarily measures the steady state or static thrust.

Accordingly, it is an object of this invention to provide an improved force transducer.

Another object of this invention is to provide a method for accurately measuring fast start transients of force as well as steady state thrust levels.

Other objects and advantages of this invention will become apparent as this description proceeds taken in conjunction with the drawings in which.

Figure 1:
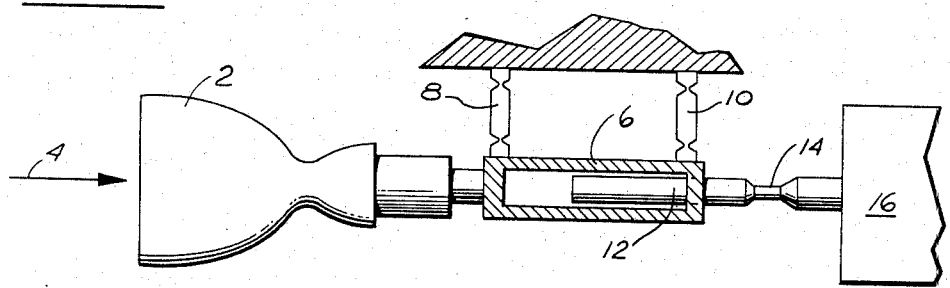
FIG. 1 is a schematic drawing of the structure according to the invention.

In FIG. 1 there is shown a rocket engine 2 which is to be tested and the thrust-time profile measured and recorded. When this engine is fired, it will produce thrust or force in the direction of arrow 4. This thrust will be exerted against an armature 6 which is supported by supports 8 and 10 which allow axial movement but prevent lateral, torsional and movements in any direction other than axial. Armature 6 has contained therein an accelerometer 12 which is mounted on or attached to the free end of load sensor 14 through armature 6. Accelerometer 12 is preferably of the piezo-electric compression type with a high resonant frequency (quartz or barium titanate crystals). Other types can be used such as electrical-resistance strain gage or a variable reluctance differential transformer. The accelerometer is not necessarily restricted to being physically located on the load cell end but may be located on the armature or at the engine depending on the damping characteristics of the coupling hardware or at some point between. Load sensor 14 is coupled between armature 6 and a base 16. When thrust in the direction of arrow 4 is exerted on armature 6, this is transferred to load cell 14 which is then placed under compression. Load cell 14 is a conventional load cell and can be a load ring, spring loaded differential transformer, a strain gage column or any other static force measuring device which has a constant spring rate K in accordance with Hooke's law. In addition, the electrical output must be proportional to deflection and therefore proportional to static load and have negligible hysteresis or damping effect. The spring rate and static calibration must also be constant when subjected to variable ambient conditions such as temperature or must be capable of compensation. Preferably, the load cell will have strain gages mounted in a Wheatstone bridge arrangement with the gages comprising semi-conductive or piezo-resistive elements. These give a large gage factor and are therefore desirable in that the electrical output is high.

Figure 2:
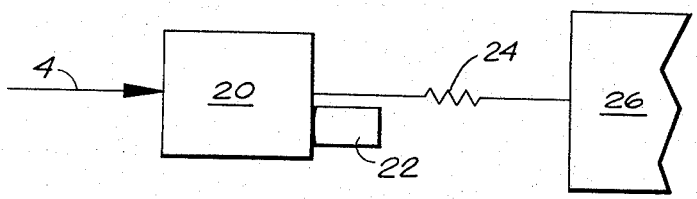
FIG. 2 is a schematic of a representative mathematical model.

In FIG. 2, an idealized or representative mathematical model of the thrust fixture is shown. The thrust chamber and associated hardware mass is indicated at 20 with the accelerometer 22 attached thereto. The thrust vector 4 is exerted on the mass which causes an acceleration to the right as viewed in FIG. 2. The load sensor 24 is shown as a spring which is resisted by a relatively rigid base 26.

The equation of motion, assuming a single degree of freedom spring and movement, is given as follows:

$$f(t) = M\ddot{x} + B\dot{x}_r + Kx_r$$

where $f(t)$ = input thrust,
$M$ = mass of thrust chamber hardware,
$\ddot{x}$ = absolute acceleration of thrust chamber,
$B$ = damping coefficient of load cell,
$\dot{x}_r$ = the velocity of the thrust chamber mass (relative to the base 26),
$K$ = spring constant of load cell,
$x_r$ = compression of load cell.

From the equation of motion, it is seen that the input thrust is the sum of the inertial force across the thrust chamber mass, the damping force, and the reaction force of the load cell. In the structure described in this application, the damping force and hystereis is extremely small and can be ignored. Therefore, the equation of motion reduces itself to the acceleration component and the load cell or sensor compression.

Since the equation of motion is the sum of two components as described, this invention sums these components electrically by summing the output of an accelerometer and output of the load cell or sensor.

Figure 3:
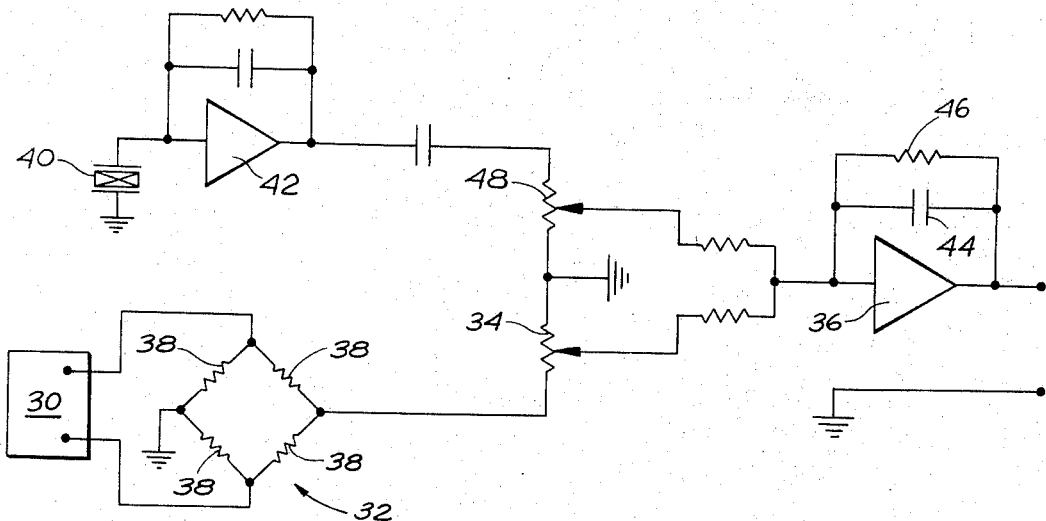
FIG. 3 is a schematic view of one embodiment of the electronics utilized in this invention.

FIG. 3 is a schematic of the transducer and electrical circuit utilized to sum the accelerometer and load sensor outputs. Power supply 30 provides the input to the load sensor Wheatstone bridge 32 which through the load sensor potentiometer 34 will give a signal to the summing amplifier 36 when the load sensor strain gage elements 38 are strained due to the compression of the load cell when there is an input force. As the thrust chamber hardware moves to the right upon initiation of firing, it will accelerate, which is measured by accelerometer 40. Accelerometer 40 has associated therewith a charge amplifier 42 which through the accelerometer potentiometer 48 also gives a signal to the summing amplifier. The summation of the load cell and accelerometer outputs are added by the summing amplifier to produce an output voltage which corresponds linearly to the input thrust. The summing amplifier is shown with a capacitor 44 across the feedback resistor 40 to attenuate spurious high frequency oscillations. If desired, a low pass filter can be used following the summation output.

To calibrate the total system, the load cell is first statically loaded with known weights and the potentiometer adjusted to establish the correct readings. The thrust chamber hardware is then tapped with a hammer and the accelerometer potentiometer adjusted until residual oscillations are minimized. In other words, the gain of the accelerometer is adjusted to agree dynamically with the load sensor gain.

The load sensor and accelerometer transducers play different but equally important roles. The accelerometer responds primarily to the high frequency content of the input forcing function while the load cell responds to the DC and low frequency content which occur at steady state thrust levels. In other words, the accelerometer measures the inertial force across the test mass while the load cell measures the steady state thrust input.

In order to better understand the contribution of the accelerometer, an examination of the classical response of a single-degree-of-freedom, spring-mass system to a step input is here made. Initially, the load cell output (mass displacement) lags the force input until the instant when the spring is compressed to its new position of static equilibrium resulting from the new static force level. At this instant, the mass has acquired sufficient momentum so that it will overshoot and oscillate. With this type of input, the acceleration compensates for this initial lag and cancels the succeeding over-shoot and oscillation. In other words, as the velocity of the thrust chamber compresses the load cell past the steady state thrust level position, the load cell will indicate a higher thrust than is actually the case. However, the thrust chamber would be decelerating with the result that the accelerometer reading will compensate for the load cell reading.

During transient force inputs, the thrustor hardware 20 of FIG. 2 will undergo an acceleration which is measured by the accelerometer to give a thrust time profile although the load sensor lags in the reading. As the force thrust level is reached, the thrust chamber hardware due to its inertia and the fact that the load sensor has reached its steady state of compression will decelerate. However, due to the momentum of the hardware, the compression of the load sensor will increase which is compensated for by the deceleration output reading of the accelerometer. Therefore, as the load sensor is oscillated, each of the swings past the steady state position are automatically compensated for by the summation of the accelerometer reading as these oscillations decay exponentially until a steady state of equilibrium occurs.

The improvements over an accelerometer uncompensated load cell can be summarized as follows.

High frequency response is obtained without the loss of sensitivity which accompanies an attempt to increase natural frequency by using a load cell with a high spring constant. A high fundamental resonant frequency load cell is not needed, because the fundamental resonant frequency of the transducer is cancelled by the accelerometer. The effectiveness of this method is relatively independent of the frequency of the fundamental resonance, with the result that the transducer's frequency response is limited only by the accelerometer's natural frequency and by higher modes of resonance in the transducer-thrustor structure. The improvement in frequency response is much greater than could be accomplished by merely using a stiffer load cell.

High sensitivity of the load sensor is a direct result of relatively low stiffness; consequently, a high output signal and low zero shift (with temperature) are attained without sacrifice of frequency response, permitting operation at lower force levels than are practical for an uncompensated load cell.

In addition to cancellation of resonances of thrustor hardware which result from transient force excitation from the input end, the accelerometer cancels spurious vibrations of the base end. This includes ambient vibrations transmitted to the base, and base vibrations excited by transient input forces. The problem of supplying a base which is very heavy, and yet contains no internal resonances within the frequency range of interest is thereby eliminated.

While the invention has been described with reference to but one electric circuit, it is considered to be within the scope of this invention to utilize any comparable circuit. For example, the load cell and accelerometer transducers can be placed in a series arrangement and this output amplified if needed to produce the summation voltage. As an example, both the accelerometer and load cell can be a Wheatstone bridge arrangement with the output from one bridge junction of either the accelerometer or load cell connected to one bridge junction of the other Wheatstone bridge.

While the invention has been described with reference to rocket engines, it is within the scope of this invention to apply the principles thereof to any application where force must be measured.

While this invention has been described with reference to the described embodiment of the invention, it is to be understood that the scope of the invention is to be measured only by the claims appended hereto.

I claim:
1. A force measuring device comprising;
    a load sensor adapted to produce signals in response to loads imposed thereon,
    an accelerometer attached to said load sensor and adapted to produce signals in response to accelerations imposed on said load sensor, and summation means adapted to receive the load sensor and accelerometer signals and to sum the signals to produce a third signal which is the sum of the load sensor and accelerometer signals.

2. A force measuring device comprising;

a load cell having strain gages thereon adapted to produce signals in response to loads placed on one end of said load cell, an accelerometer mounted on said one end of said load cell and adapted to produce signals in response to accelerations of said one end of said load cell, indicator means adapted to receive the load cell and accelerometer signals and to produce signals representing the sum of the load cell and accelerometer signals.

3. A force measuring device according to claim 2 wherein mounting means are provided to restrain said thrust measuring device to a single degree of freedom movement.

4. A force measuring device for rocket engines comprising;

coupling means adapted to be attached to a rocket engine and to receive thrust therefrom, load cell means attached to said coupling means and adapted to receive thrust imparted thereto from said rocket engine, said load cell having transducers thereon adapted to produce signals in response to thrust imparted to the load cell, accelerometer means attached to the load cell at one end thereof and adapted to produce signals in response to acceleration of said one end, indicator means adapted to receive said load cell and accelerometer signals and further adapted to produce signals representing the sum of said load cell and accelerometer signals, whereby when thrust is imparted to said coupling means and said load cell, said accelerometer signals will compensate for acceleration errors in said load cell signals.

5. A force measuring device according to claim 4 wherein said signals are electrical signals.

6. A method of measuring force of a rocket engine which comprises;

coupling a load cell to said rocket engine to receive thrust therefrom, coupling an accelerometer to the end of said load cell which receives thrust from said rocket engine, firing said rocket engine, receiving signals from said load cell and accelerometer, adding said load cell and accelerometer signals to produce a third signal representing the sum thereof, whereby acceleration error is compensated for.

7. A force measuring device comprising;

a load cell for producing an output indicative of loads imposed thereon, an accelerometer for producing an output indicative of acceleration of said load cell, and means for algebraically summing said load cell and accelerometer outputs to produce a summed output.

References Cited

UNITED STATES PATENTS

| | | | |
|---|---|---|---|
| 2,767,974 | 10/1956 | Ballard et al. | 73—432 X |
| 2,873,604 | 2/1959 | Samsel | 73—67.1 |
| 3,191,442 | 6/1965 | Hutchinson | 73—432 |
| 3,258,959 | 7/1966 | Deegan | 73—116 |

RICHARD C. QUEISSER, *Primary Examiner.*

JAMES GILL, *Examiner.*

J. W. MYRACLE, *Assistant Examiner.*